(12) United States Patent
Akiba et al.

(10) Patent No.: US 7,683,152 B2
(45) Date of Patent: Mar. 23, 2010

(54) PARTIAL BLOCK POLYIMIDE-POLYSILOXANE COPOLYMER, MAKING METHOD, AND RESIN COMPOSITION COMPRISING THE COPOLYMER

(75) Inventors: Hideki Akiba, Usui-gun (JP); Nobuhiro Ichiroku, Usui-gun (JP); Toshio Shiobara, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 517 days.

(21) Appl. No.: 11/131,197

(22) Filed: May 18, 2005

(65) Prior Publication Data

US 2005/0261456 A1 Nov. 24, 2005

(30) Foreign Application Priority Data

May 21, 2004 (JP) ............................. 2004-151486

(51) Int. Cl.
*C08G 77/24* (2006.01)
(52) U.S. Cl. .......................................... 528/26; 528/38
(58) Field of Classification Search .................. 528/26, 528/38
See application file for complete search history.

(56) References Cited

U.S. PATENT DOCUMENTS

| | | | | |
|---|---|---|---|---|
| 5,180,627 | A * | 1/1993 | Inoue et al. | 428/214 |
| 5,209,981 | A * | 5/1993 | Rojstaczer | 428/447 |
| 5,300,627 | A * | 4/1994 | Kunimune et al. | 528/353 |
| 5,643,986 | A * | 7/1997 | Ishikawa et al. | 524/366 |
| 6,468,639 | B2 * | 10/2002 | Ishikawa et al. | 428/209 |
| 2003/0026998 | A1 * | 2/2003 | Yamaguchi et al. | 428/425.5 |
| 2004/0019174 | A1 * | 1/2004 | Ichiroku et al. | 528/25 |

FOREIGN PATENT DOCUMENTS

| | | |
|---|---|---|
| JP | 5-9254 | 1/1993 |
| JP | 05/025453 | 2/1993 |
| JP | 05-140524 | 6/1993 |
| JP | 05-178992 | 7/1993 |
| JP | 6-116517 | 4/1994 |
| JP | 07-304950 | 11/1995 |
| JP | 10-195402 | 7/1998 |
| JP | 2004-051794 | 2/2004 |
| JP | 2004-51794 | 2/2004 |

\* cited by examiner

*Primary Examiner*—Margaret G Moore
(74) *Attorney, Agent, or Firm*—Oblon, Spivak, McClelland, Maier & Neustadt, L.L.P.

(57) ABSTRACT

A partial block polyimide-polysiloxane copolymer is provided comprising repeat unit structures having structural formulae (1) and (2) wherein X is an aromatic or aliphatic ring-containing tetravalent organic radical, $Y_1$ is a diamine residue, $Y_2$ is a diaminosiloxane residue, $Y_1$ and $Y_2$ are contained in the copolymer in amounts of 99-20 mol % and 1-80 mol %, respectively, L and m each are an integer of 2-50. The copolymer has good adhesion to substrates, moisture-proof reliability and a low modulus of elasticity.

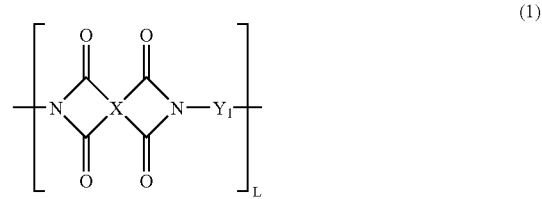

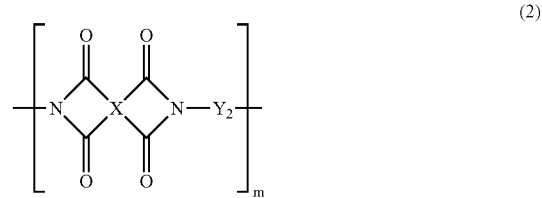

5 Claims, No Drawings

PARTIAL BLOCK POLYIMIDE-POLYSILOXANE COPOLYMER, MAKING METHOD, AND RESIN COMPOSITION COMPRISING THE COPOLYMER

CROSS-REFERENCE TO RELATED APPLICATION

This non-provisional application claims priority under 35 U.S.C. §119(a) on Patent Application No. 2004-151486 filed in Japan on May 21, 2004, the entire contents of which are hereby incorporated by reference.

TECHNICAL FIELD

This invention relates to partial block polyimide-polysiloxane copolymers having improved adhesion to substrates, high heat resistance and a low modulus of elasticity; methods of preparing the same; and compositions comprising the same.

BACKGROUND ART

Due to heat resistance, polyimide-based materials are widely used in adhesives, sheet materials, sealants and the like. In general, polyimide is dissolved in a solvent to form a varnish, which is applied to a semiconductor device or the like directly or via an insulating film and cured to form a protective film of polyimide resin. This is followed by encapsulation with a molding material, typically epoxy resin. The resulting package, in which components including the chip, substrate and encapsulant have different coefficients of expansion, suffer thermal stresses during subsequent steps such as thermal cycling and solder reflow, inducing chip cracks or thermal degradation. It is thus required to endow a polyimide resin protective film with a sufficiently low modulus of elasticity to absorb such stresses. One approach for reducing the modulus of elasticity is by incorporating siloxane linkages into the polyimide resin structure. The problems of this approach are that the cured film has a lower glass transition temperature (Tg) and the resin has degraded heat resistance. For example, JP-A 5-009254 and JP-A 6-116517 disclose siloxane-modified polyamide-imides, which resins have insufficient bond strength to copper foil and still suffer from the problems including lower Tg of cured film and the degraded heat resistance of resin.

In JP-A 2004-051794 or U.S. Ser. No. 10/621,527, the inventors proposed a polyimide silicone having phenolic hydroxyl radicals having high reactivity with epoxy resins, intended for the advanced die bonding or lead frame bonding. It would be desirable to endow the polyimide silicone with more heat resistance and a lower modulus of elasticity.

With respect to the synthesis of polyimide-siloxane copolymer, it is known that if the conventional two-stage synthesis process proceeds by way of polyamic acid of multiple components, the polyamic acid readily undergoes exchange reaction between amide radicals in a solvent, leading to a random copolymer. In the random copolymer, the properties of respective components are averaged. Thus a block copolymer is more effective than a random copolymer in imparting properties of the other component while maintaining the inherent properties of the polyimide resin. There is a need for efficient synthesis of the block copolymer.

SUMMARY OF THE INVENTION

An object of the present invention is to provide partial block polyimide-polysiloxane copolymers having benefits including improved adhesion, moisture-proof reliability and a low modulus of elasticity; methods of preparing the same; and compositions comprising the same.

The inventors have found that partial block polyimide-polysiloxane copolymers comprising repeat unit structures or blocks represented by structural formulae (1) and (2), structural formulae (2) and (8), or structural formulae (1), (2) and (8), shown below, have many benefits including adhesion, heat resistance and a low modulus of elasticity; and that these partial block polyimide-polysiloxane copolymers can be effectively prepared by the following methods.

Accordingly, the invention provides partial block polyimide-polysiloxane copolymers as defined below, methods of preparing these copolymers, and resin compositions comprising these copolymers.

As used herein, the term "partial block" means that a polyimide-polysiloxane copolymer essentially contains repeat unit structures or blocks of a certain chain length (or repeat number) represented by formulae (1) and (2), formulae (2) and (8), or formulae (1), (2) and (8), and that the arrangement of respective blocks in the copolymer may be random. The polyimide-polysiloxane copolymer of the invention may contain additional repeat units other than the repeat unit structures or blocks represented by formulae (1) and (2), structural formulae (2) and (8), or structural formulae (1), (2) and (8), with examples of the additional repeat units including units of formulae (1), (2) and (8) wherein the repeat numbers L, m and j each are less than 2.

[I] A partial block polyimide-polysiloxane copolymer comprising repeat unit structures having the following structural formulae (1) and (2).

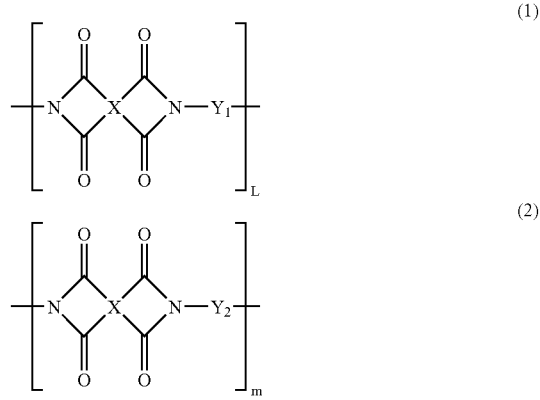

Herein X is at least one aromatic or aliphatic ring-containing tetravalent organic radical, $Y_1$ is a divalent organic radical other than the structural formula (3), $Y_2$ is a divalent organic radical having the structural formula (3), $Y_1$ and $Y_2$ are contained in the copolymer in molar amounts $y_1$ and $y_2$, respectively, which satisfy $y_1/(y_1+y_2)=0.99$ to $0.20$ and $y_2/(y_1+y_2)=0.01$ to $0.80$, L is a natural number of 2 to 50, m is a natural number of 2 to 50.

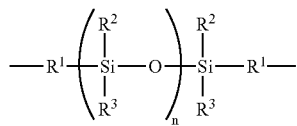
(3)

Herein $R^1$ is a divalent organic radical of 3 to 9 carbon atoms, $R^2$ and $R^3$ are each independently a substituted or unsubstituted, monovalent hydrocarbon radical of 1 to 8 carbon atoms, and n is an integer of 1 to 150.

[II] A method for preparing the partial block polyimide-polysiloxane copolymer of [I], comprising the step of reacting substantially equimolar amounts of at least one member selected from among diamine compounds having the general formulae (4) and (5) with at least one member selected from among tetracarboxylic acid dianhydrides having the general formulae (6) and (7), their precursors, tetracarboxylic acids and ester derivatives thereof,

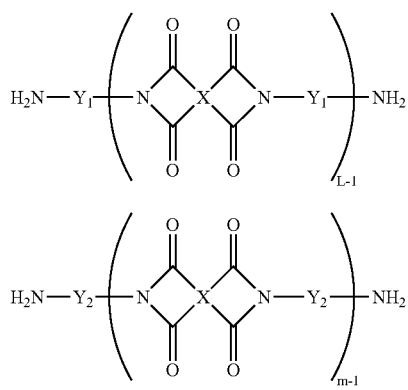
(4)

(5)

wherein X, $Y_1$, $Y_2$, L and m are as defined in [I],

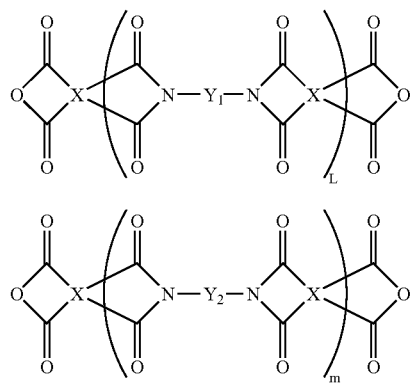
(6)

(7)

wherein X, $Y_1$, $Y_2$, L and m are as defined above,
with the proviso that at least the diamine compound of formula (4) is to be reacted with at least the tetracarboxylic acid dianhydride of formula (7) or its precursor, tetracarboxylic acid or ester derivative thereof, and at least the diamine compound of formula (5) is to be reacted with at least the tetracarboxylic acid dianhydride of formula (6) or its precursor, tetracarboxylic acid or ester derivative thereof.

[III] A partial block polyimide-polysiloxane copolymer comprising repeat unit structures having the following structural formulae (2) and (8).

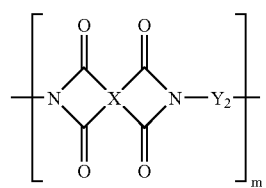
(2)

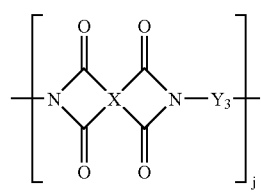
(8)

Herein X is at least one aromatic or aliphatic ring-containing tetravalent organic radical, $Y_2$ is a divalent organic radical having the structural formula (3), $Y_3$ is a divalent organic radical having the structural formula (9), $Y_2$ and $Y_3$ are contained in the copolymer in molar amounts $y_2$ and $y_3$, respectively, which satisfy $y_2/(y_2+y_3)=0.99$ to 0.01 and $y_3/(y_2+y_3)=0.01$ to 0.99, m is a natural number of 2 to 50, j is a natural number of 2 to 50.

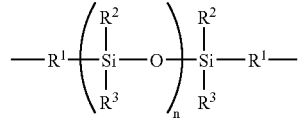
(3)

Herein $R^1$ is a divalent organic radical of 3 to 9 carbon atoms, $R^2$ and $R^3$ are each independently a substituted or unsubstituted, monovalent hydrocarbon radical of 1 to 8 carbon atoms, and n is an integer of 1 to 150.

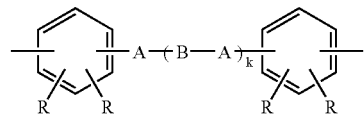
(9)

Herein A is a radical selected from the following group [9a]:

group [9a]

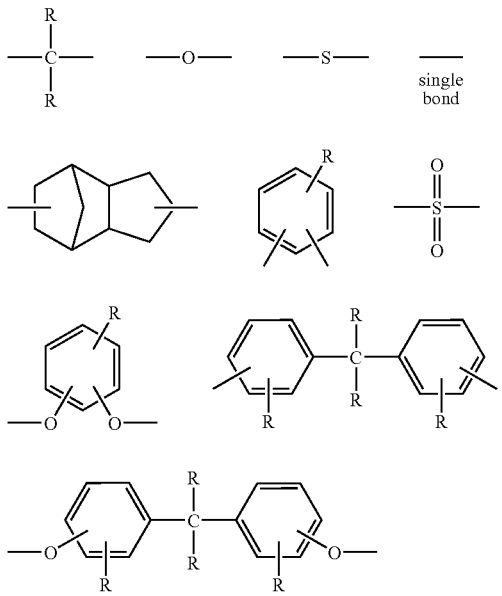

B is a radical selected from the following group [9b]:

group [9b]

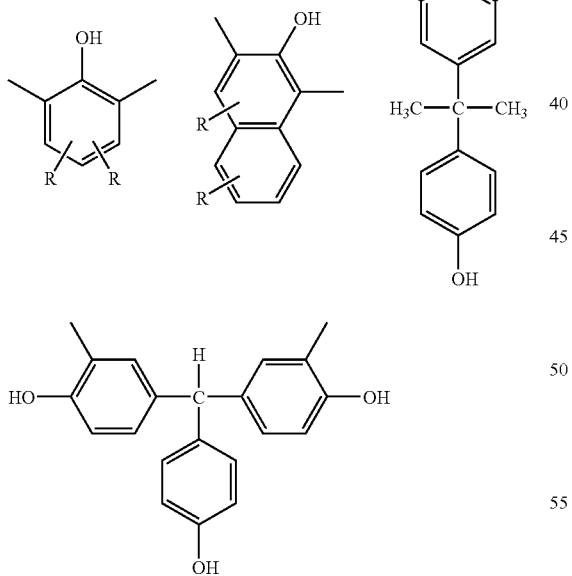

R is each independently a hydrogen atom, halogen atom or substituted or unsubstituted, monovalent hydrocarbon radical of 1 to 8 carbon atoms, and k is a natural number of 1 to 5.

[IV] A method for preparing the partial block polyimide-polysiloxane copolymer of [III], comprising the step of reacting substantially equimolar amounts of at least one diamine compound having the general formula (10):

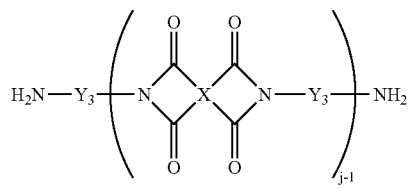

wherein X, $Y_3$, and j are as defined in [III], with at least one tetracarboxylic acid dianhydride having the general formula (7):

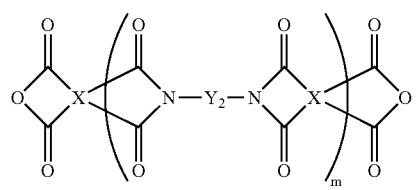

wherein X, $Y_2$I and m are as defined in claim 3, or its precursor, tetracarboxylic acid or ester derivative thereof.

[V] A partial block polyimide-polysiloxane copolymer comprising repeat unit structures having the following structural formulae (1), (2) and (8).

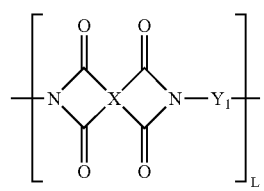

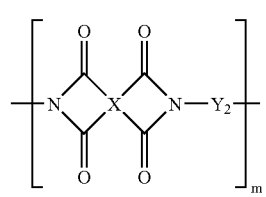

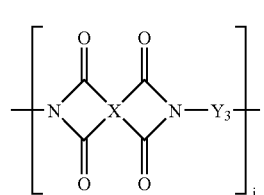

Herein X is at least one aromatic or aliphatic ring-containing tetravalent organic radical, $Y_1$ is a divalent organic radical other than the structural formulae (3) and (9), $Y_2$ is a divalent organic radical having the structural formula (3), $Y_3$ is a divalent organic radical having the structural formula (9), $Y_1$, $Y_2$ and $Y_3$ are contained in the copolymer in molar amounts $y_1$, $y_2$ and $y_3$, respectively, which satisfy $y_1/(y_1+y_2+y_3)$=0.01 to 0.98,
$y_2/(y_1+y_2+y_3)$=0.01 to 0.80, and
$y_3/(y_1+y_2+y_3)$=0.01 to 0.98, L is a natural number of 2 to 50, m is a natural number of 2 to 50, j is a natural number of 2 to 50.

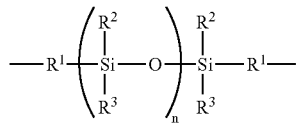
(3)

Herein $R^1$ is a divalent organic radical of 3 to 9 carbon atoms, $R^2$ and $R^3$ are each independently a substituted or unsubstituted, monovalent hydrocarbon radical of 1 to 8 carbon atoms, and n is an integer of 1 to 150.

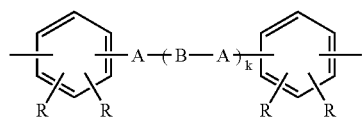
(9)

Herein A is a radical selected from the following group [9a]:
group [9a]

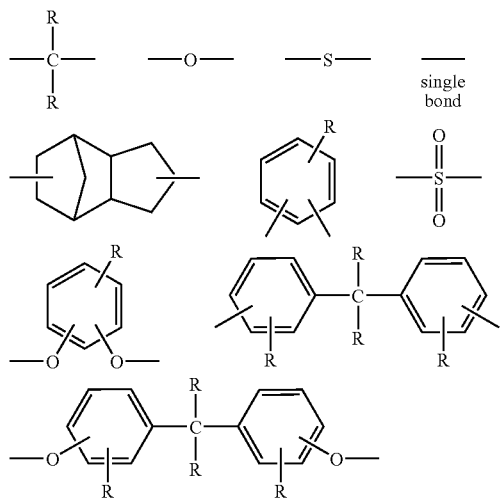

B is a radical selected from the following group [9b]:

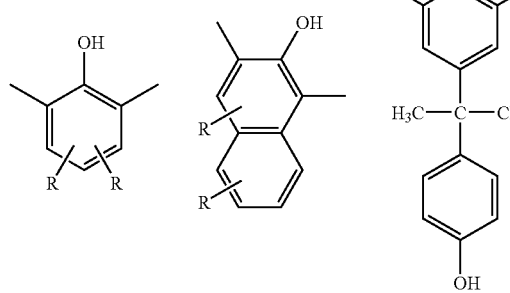

-continued

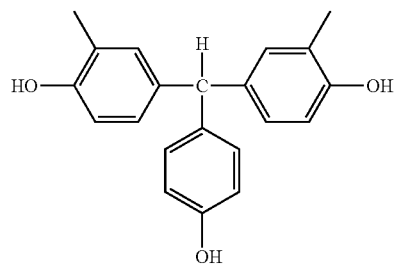

R is each independently a hydrogen atom, halogen atom or substituted or unsubstituted, monovalent hydrocarbon radical of 1 to 8 carbon atoms, and k is a natural number of 1 to 5.

[VI] A method for preparing the partial block polyimide-polysiloxane copolymer of [V], comprising the step of reacting substantially equimolar amounts of at least one diamine compound having the general formula (4), at least one diamine compound having the general formula (5), and at least one diamine compound having the general formula (10) with at least one member selected from among tetracarboxylic acid dianhydrides having the general formula (6) and (7), their precursors, tetracarboxylic acids and ester derivatives thereof,

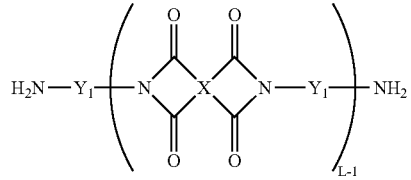
(4)

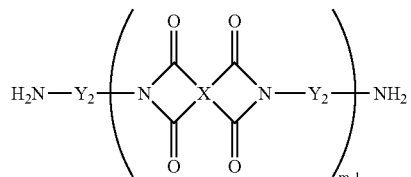
(5)

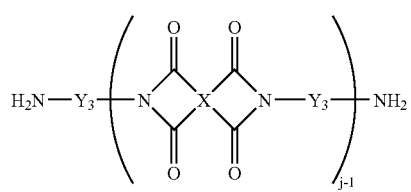
(10)

wherein X, $Y_1$, $Y_2$, $Y_3$, L, m and j are as defined in [V],

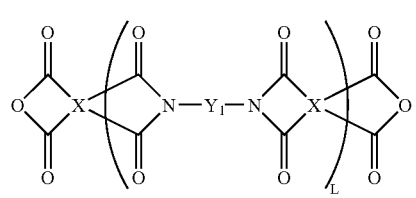
(6)

-continued

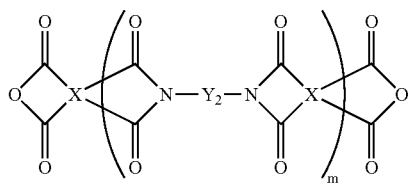
(7)

wherein X, $Y_1$, $Y_2$, L and m are as defined above,
with the proviso that at least a mixture of the diamine compound of formula (4) and the diamine compound of formula (10) is to be reacted with at least the tetracarboxylic acid dianhydride of formula (7) or its precursor, tetracarboxylic acid or ester derivative thereof, and at least a mixture of the diamine compound of formula (5) and the diamine compound of formula (10) is to be reacted with at least the tetracarboxylic acid dianhydride of formula (6) or its precursor, tetracarboxylic acid or ester derivative thereof.

[VII] A resin composition comprising the partial block polyimide-polysiloxane copolymer of [I], [III] or [V] and an epoxy resin having at least two epoxy radicals in a molecule.

The partial block polyimide-polysiloxane copolymers of the invention have many benefits including improved adhesion to substrates, moisture-proof reliability and a low modulus of elasticity.

DESCRIPTION OF THE PREFERRED EMBODIMENTS

The first embodiment of the invention is a partial block polyimide-polysiloxane copolymer comprising repeat unit structures or blocks having the following structural formulae (1) and. (2).

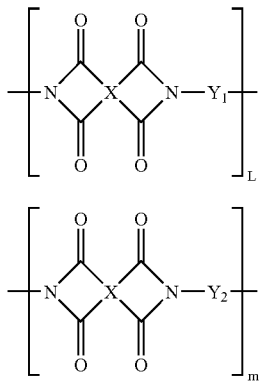

Herein X is one or more aromatic or aliphatic ring-containing tetravalent organic radicals. $Y_1$ is a divalent organic radical other than the structural formula (3), preferably an aromatic ring-containing divalent organic radical such as an aromatic diamine residue derived from an aromatic diamine having 1 to about 8 aromatic rings, desirably 1 to about 4 aromatic rings. $Y_2$ is a divalent organic radical having the structural formula (3), that is, a divalent linear diorganopolysiloxane residue. The copolymer contains $Y_1$ and $Y_2$ in molar amounts $Y_1$ and $Y_2$, respectively, which satisfy
  $y_1/(y_1+y_2)=0.99$ to $0.20$ and
  $y_2/(y_1+y_2)=0.01$ to $0.80$.

The subscript L is a natural number of 2 to 50, and m is a natural number of 2 to 50.

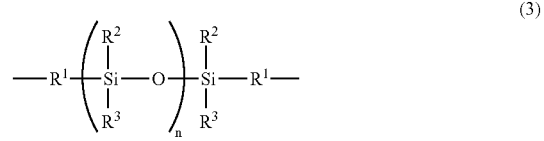
(3)

Herein $R^1$ is a divalent organic radical of 3 to 9 carbon atoms, $R^2$ and $R^3$ are each independently a substituted or unsubstituted, monovalent hydrocarbon radical of 1 to 8 carbon atoms, and n is an integer of 1 to 150.

The partial block polyimide-polysiloxane copolymer of the first embodiment has a weight average molecular weight of typically about 5,000 to about 200,000, and preferably about 8,000 to about 150,000, as measured by gel permeation chromatography (GPC) relative to polystyrene standards (the same throughout the specification). With too low a molecular weight, a cured film may have a low strength.

The partial block polyimide-polysiloxane copolymer of the first embodiment can be synthesized by reacting substantially equimolar amounts of at least one member selected from among diamine compounds having the general formulae (4) and (5):

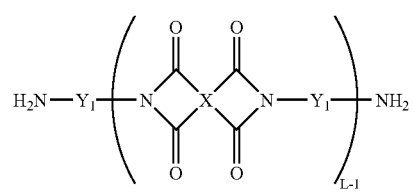
(4)

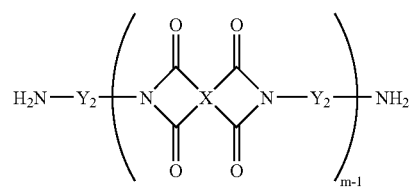
(5)

wherein X, $Y_1$, $Y_2$, L and m are as defined above, with at least one member selected from among tetracarboxylic acid dianhydrides having the general formulae (6) and (7):

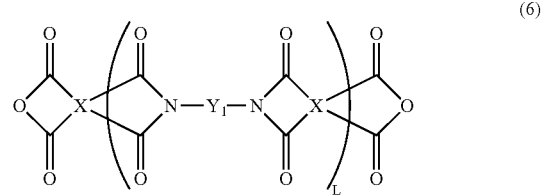
(6)

-continued (7)

[Structure of formula (7)]

wherein X, Y₁, Y₂, L and m are as defined above, their precursors, tetracarboxylic acids and ester derivatives thereof. It is requisite that at least the diamine compound of formula (4) be reacted with at least the tetracarboxylic acid dianhydride of formula (7) or its precursor, tetracarboxylic acid or ester derivative thereof, and at least the diamine compound of formula (5) be reacted with at least the tetracarboxylic acid dianhydride of formula (6) or its precursor, tetracarboxylic acid or ester derivative thereof.

The polyimide oligomers having the general formulae (4) and (6) can be prepared by reacting a tetracarboxylic acid dianhydride of the structural formula (11):

[Structure of formula (11)]

wherein X is as defined above, with a diamine of the structural formula (12):

$$H_2N—Y_1—NH_2 \quad (12)$$

wherein $Y_1$ is as defined above at a predetermined molar ratio in an organic solvent to form a polyamic acid resin, followed by cyclodehydration in a conventional manner.

Examples of the tetravalent organic radical represented by X are given below.

[Chemical structures]

Examples of the radical represented by $Y_1$ include residues of the following diamines. Included are aromatic ring-containing diamines such as, for example, p-phenylenediamine, m-phenylenediamine, 4,4'-diaminodiphenylmethane, 4,4'-diaminodiphenyl ether, 2,2'-bis(4-aminophenyl)propane, 4,4'-diaminodiphenyl sulfone, 4,4'-diaminodiphenylsulfide, 1,4-bis(3-aminophenoxy)benzene, 1,4-bis(4-aminophenoxy)benzene, 1,4-bis(p-aminophenylsulfonyl)benzene, 1,4-bis(m-aminophenylsulfonyl)benzene, 1,4-bis(p-aminophenylthioether)benzene, 1,4-bis(m-aminophenylthioether)benzene, 2,2-bis[4-(4-aminophenoxy)phenyl]propane, 2,2-bis[3-methyl-4-(4-aminophenoxy)phenyl]propane, 2,2-bis[3-chloro-4-(4-aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3,5-dimethyl-4-(4-aminophenoxy)phenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3,5-dimethyl-4-(4-aminophenoxy)phenyl]methane, bis[4-(4-aminophenoxy)phenyl]sulfone, and 2,2-bis[4-(4-aminophenoxy)phenyl]perfluoropropane.

Of these, preference is given to 4,4'-diaminodiphenylmethane, 4,4'-diaminodiphenyl ether, 1,4-bis(3-aminophenoxy)benzene, 1,4-bis(4-aminophenoxy)benzene, 2,2-bis[4-(4-aminophenoxy)phenyl]propane, and 2,2-bis[3-methyl-4-(4-aminophenoxy)phenyl]propane.

Specifically, for the amine-terminated oligomer of formula (4), there are used p moles of tetracarboxylic acid dianhydride (11) and (p+1) moles of diamine (12). For the acid anhydride-terminated oligomer of formula (6), there are used (q+1) moles of tetracarboxylic acid dianhydride (11) and q moles of diamine (12). Note that p is a natural number of at least 1, for example, in a range of 1 to 49, and q is a natural number of at least 2, for example, in a range of 2 to 50.

Illustrative, non-limiting examples of the tetracarboxylic acid dianhydride having formula (11) are given below.

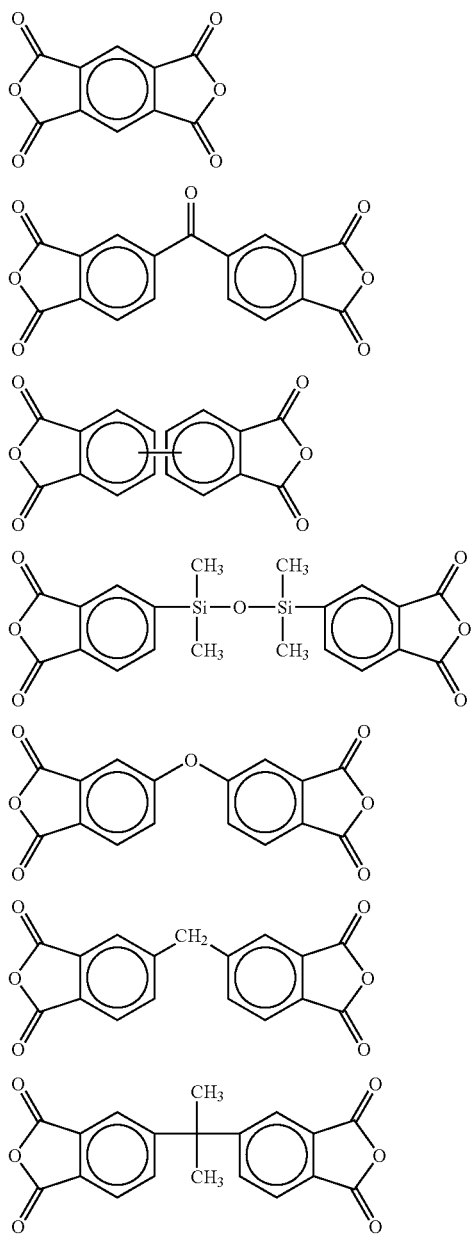

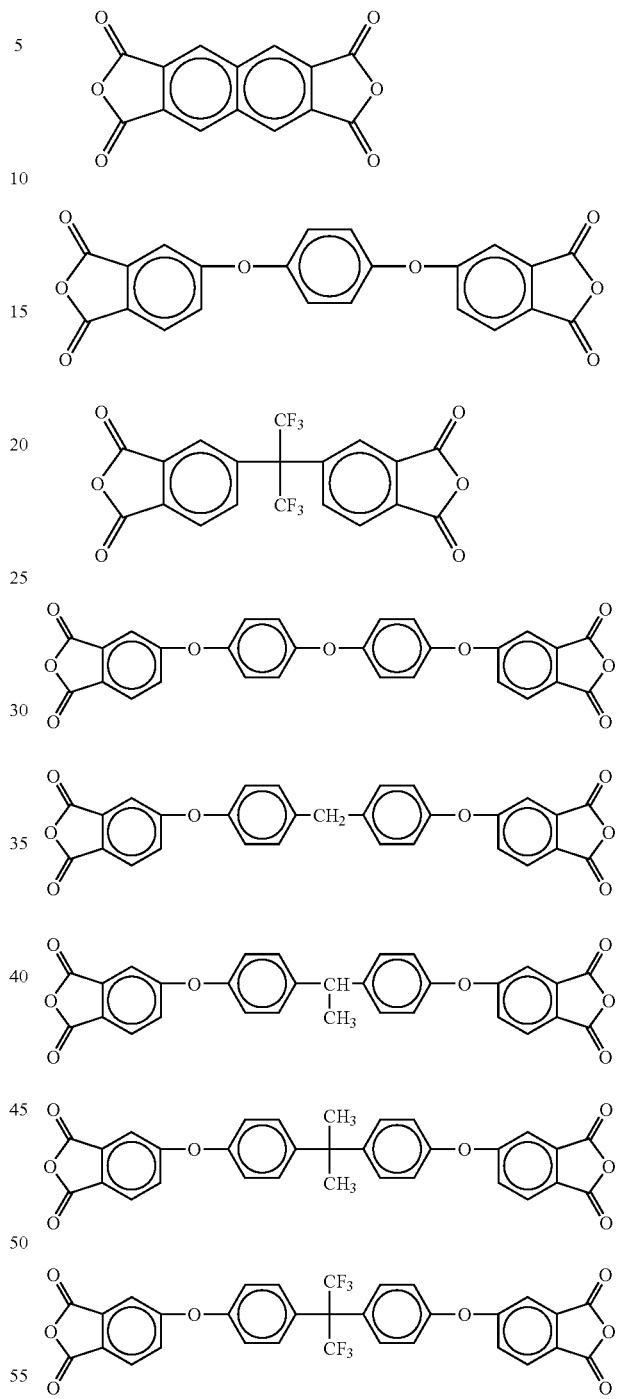

It is understood that the tetracarboxylic acid dianhydrides having formula (11) may be used alone or in admixture of two or more, if desired.

Examples of the diamine having formula (12) include, but are not limited to, aromatic ring-containing diamines such as, for example, p-phenylenediamine, m-phenylenediamine, 4,4'-diaminodiphenylmethane, 4,4'-diaminodiphenyl ether, 2,2'-bis(4-aminophenyl)propane, 4,4'-diaminodiphenyl sulfone, 4,4'-diaminodiphenylsulfide, 1,4-bis(3-aminophenoxy)

benzene, 1,4-bis(4-aminophenoxy)benzene, 1,4-bis(p-aminophenylsulfonyl)benzene, 1,4-bis(m-aminophenylsulfonyl)benzene, 1,4-bis(p-aminophenylthioether)benzene, 1,4-bis(m-aminophenylthioether)benzene, 2,2-bis[4-(4-aminophenoxy)phenyl]propane, 2,2-bis[3-methyl-4-(4-aminophenoxy)phenyl]propane, 2,2-bis[3-chloro-4-(4-aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3,5-dimethyl-4-(4-aminophenoxy)phenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3,5-dimethyl-4-(4-aminophenoxy)phenyl]methane, bis[4-(4-aminophenoxy)phenyl]sulfone, and 2,2-bis[4-(4-aminophenoxy)phenyl]perfluoropropane.

Of these, preference is given to 4,4'-diaminodiphenylmethane, 4,4'-diaminodiphenyl ether, 1,4-bis(3-aminophenoxy)benzene, 1,4-bis(4-aminophenoxy)benzene, 2,2-bis[4-(4-aminophenoxy)phenyl]propane, and 2,2-bis[3-methyl-4-(4-aminophenoxy)phenyl]propane.

These diamines may be used alone or in admixture of two or more, if desired.

Described below is the reaction to form the polyimide oligomer. The above-mentioned reactants are dissolved in a solvent in an inert atmosphere, and reacted typically at a temperature equal to or lower than 80° C., preferably 0 to 60° C., synthesizing a polyamic acid oligomer. The polyamic acid oligomer is then heated typically at a temperature of 100 to 250° C., preferably 150 to 200° C., whereby the acid amide moiety of polyamic acid oligomer is cyclodehydrated, thereby synthesizing the desired polyimide oligomer. To facilitate the cyclodehydration, an azeotropic dehydrating agent such as toluene or xylene is desirably used. Imidization can also be effected by adding a mixture of acetic anhydride and pyridine to the polyamic acid oligomer solution and heating the resulting solution to about 50° C.

The solvents used in the above reaction may be those solvents in which the reactants are not wholly soluble as long as they are inert to the resulting polyamic acid and polyimide. Examples include tetrahydrofuran, 1,4-dioxane, cyclopentanone, cyclohexanone, γ-butyrolactone, N-methylpyrrolidone, N,N-dimethylacetamide, N,N-dimethylformamide and dimethyl sulfoxide. Of these, aprotic polar solvents are preferred, with N-methylpyrrolidone, cyclohexanone and γ-butyrolactone being most preferred. The solvents may be used alone or in admixture of two or more.

The thus obtained polyimide oligomers often have a molecular weight distribution. The letter L in formulae (4) and (6) and structural formula (1) derived therefrom is given, for example, as a statistical average value such as a weight average over the entire polyimide oligomer component (4) or (6), and for an individual molecule, L is a natural number of 2 to 50, preferably a natural number of 2 to 40, more preferably a natural number of 3 to 40, even more preferably a natural number of 5 to 40. The proportion of L being equal to or less than 2 is preferably less than 50% of the entirety, and more preferably less than 40% of the entirety. A value of L in excess of 50 is undesired because the oligomer becomes less compatible with the siloxane structure-bearing oligomer so that the film loses homogeneity. If the proportion of L being equal to or less than 2 is equal to or more than 50% of the entirety, the advantages of low modulus and high heat resistance due to partial block formation may fade away.

The polyimide oligomers having the general formulae (5) and (7) can be prepared by reacting a tetracarboxylic acid dianhydride of the structural formula (11):

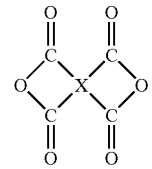

(11)

wherein X is as defined above, with a siloxane diamine of the structural formula (13):

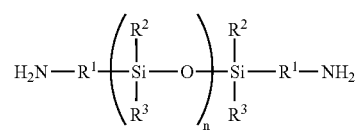

(13)

wherein $R^1$, $R^2$, $R^3$ and n are as defined above at a predetermined molar ratio in an organic solvent to form a polyamic acid resin, followed by cyclodehydration in a conventional manner.

Specifically, for the amine-terminated oligomer of formula (5), there are used r moles of tetracarboxylic acid dianhydride (11) and (r+1) moles of diamine (13). For the acid anhydride-terminated oligomer of formula (7), there are used (s+1) moles of tetracarboxylic acid dianhydride (11) and s moles of diamine (13). Note that r is a natural number of at least 1, for example, in a range of 1 to 49, and s is a natural number of at least 2, for example, in a range of 2 to 50.

Illustrative examples of the tetracarboxylic acid dianhydride having formula (11) are as set forth above.

In conjunction with the siloxane diamine or α,ω-diaminosiloxane having formula (13), $R^1$ stands for divalent organic radicals of 3 to 9 carbon atoms. Suitable radicals include divalent hydrocarbon radicals which may contain an ether oxygen atom, for example, alkylene radicals such as —(CH$_2$)$_3$—, —(CH$_2$)$_4$—, —CH$_2$CH(CH$_3$)—, —(CH$_2$)$_6$—, and —(CH$_2$)$_8$—; arylene radicals such as

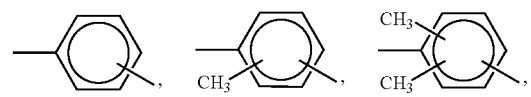

alkylene-arylene radicals resulting from a combination of the foregoing, oxyalkylene radicals such as —(CH$_2$)$_3$—O—, —(CH$_2$)$_4$—O—, oxyarylene radicals such as

oxyalkylene-arylene radicals resulting from a combination of the foregoing, such as

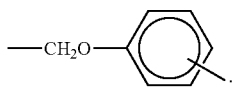

R² and R³ stand for substituted or unsubstituted, monovalent hydrocarbon radicals of 1 to 8 carbon atoms, which include alkyl radicals such as methyl, ethyl, propyl, isopropyl, butyl, isobutyl, tert-butyl, hexyl, cyclohexyl, 2-ethylhexyl and octyl; alkenyl radicals such as vinyl, allyl, propenyl, isopropenyl, butenyl, isobutenyl and hexenyl; aryl radicals such as phenyl, tolyl and xylyl; aralkyl radicals such as benzyl and phenylethyl; substituted forms of the foregoing in which some or all of the hydrogen atoms attached to carbon atoms are replaced by halogen atoms (e.g., fluoro, bromo or chloro), typically halo-substituted alkyl radicals such as chloromethyl, bromoethyl and 3,3,3-trifluoropropyl. Of these, methyl and phenyl are preferred. The subscript n is an integer of 1 to 150, preferably an integer of 1 to 120, and more preferably an integer of 1 to 100.

Illustrative, non-limiting examples of the siloxane diamine having formula (13) are given below.

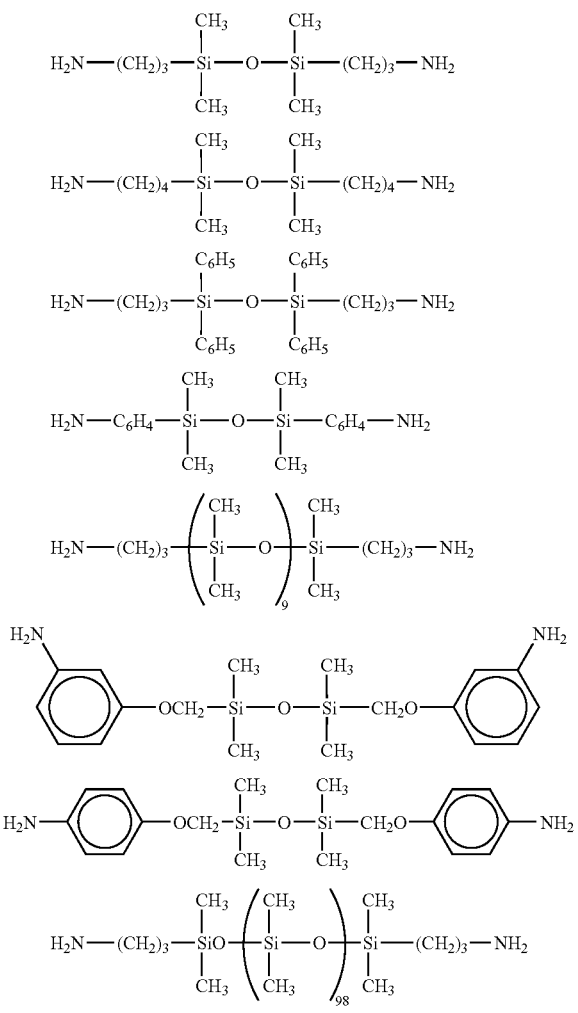

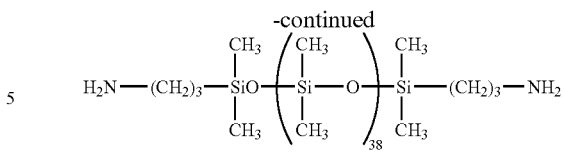

The diaminosiloxane compounds having formula (13) may be used alone or in admixture of two or more if desired.

The reaction to form the polyimide oligomer is the same as set forth above. Any organic solvent as exemplified above may be used.

The thus obtained polyimide oligomers often have a molecular weight distribution. The letter m in formulae (5) and (7) and structural formula (2) derived therefrom is given, for example, as a statistical average value such as a weight average over the entire polyimide oligomer component (5) or (7), and for an individual molecule, m is a natural number of 2 to 50, preferably a natural number of 2 to 40, more preferably a natural number of 3 to 40, even more preferably a natural number of 5 to 40. The proportion of m being equal to or less than 2 is preferably less than 50% of the entirety, and more preferably less than 40% of the entirety. A value of m in excess of 50 is undesired because the oligomer becomes less compatible with the siloxane structure-free oligomer so that the film loses homogeneity. If the proportion of m being equal to or less than 2 is equal to or more than 50% of the entirety, the advantages of low modulus and high heat resistance due to partial block formation may fade away.

The target partial block polyimide-polysiloxane copolymer can be synthesized by reacting at least one member selected from among diamine compounds having the general formulae (4) and (5) with at least one member selected from among tetracarboxylic acid dianhydrides having the general formulae (6) and (7), their precursors, tetracarboxylic acids and ester derivatives thereof, in substantially equimolar amounts, for example, 1 mole of the former with 0.95 to 1.1 moles of the latter. The reaction to form the polyimide may be the same as the reaction to form the polyimide oligomer set forth above. Any organic solvent as exemplified above may be used.

In the partial block polyimide-polysiloxane copolymer of the invention, $Y_2$ constitutes a siloxane component. Provided that the molar amounts of $Y_1$ and $Y_2$ contained in the copolymer are $y_1$ moles and $y_2$ moles, respectively, $Y_2$ should satisfy $y_2/(y_1+y_2)=0.01$ to 0.80, and preferably 0.02 to 0.70. A value $y_2/(y_1+y_2)$ of less than 0.01 provides a less modulus-reducing effect whereas a value $y_2/(y_1+y_2)$ of more than 0.80 leads to degradation of heat resistance and an increase of moisture permeability.

Consequently, the molar amount $y_1$ of $Y_1$ in the copolymer satisfies $y_1/(y_1+y_2)=0.99$ to 0.20, and preferably 0.98 to 0.30.

By incorporating repeat unit structures having the structural formula (8) into the copolymer in addition to the repeat unit structures having the structural formulae (1) and (2), a partial block polyimide-polysiloxane copolymer having highly reactive hydroxyl radicals of the second embodiment is available. The partial block polyimide-polysiloxane copolymer of the second embodiment generally has a weight average molecular weight of about 5,000 to about 200,000, preferably about 8,000 to about 150,000. With too low a molecular weight, the cured film may have a low strength.

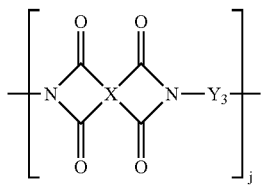
(8)

In formula (8), X is at least one aromatic or aliphatic ring-containing tetravalent organic radical, $Y_3$ is a divalent organic radical having the structural formula (9) shown below, and j is a natural number of 2 to 50.

In the copolymer comprising repeat unit structures having the formulae (1), (2) and (8), $Y_1$, $Y_2$ and $Y_3$ are contained in molar amounts $y_1$, $y_2$ and $y_3$, respectively, which satisfy $y_1/(y_1+y_2+y_3)=0.01$ to $0.98$,
$y_2/(y_1+y_2+y_3)=0.01$ to $0.80$, and
$y_3/(y_1+y_2+y_3)=0.01$ to $0.98$.

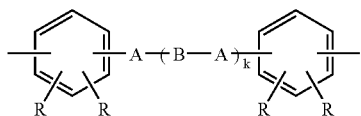
(9)

In formula (9), A is a radical selected from the following group [9a], and B is a radical selected from the following group [9b].

group [9a]

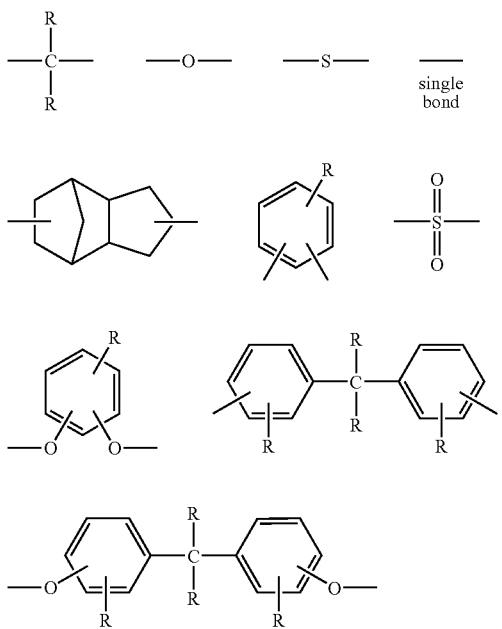

group [9b]

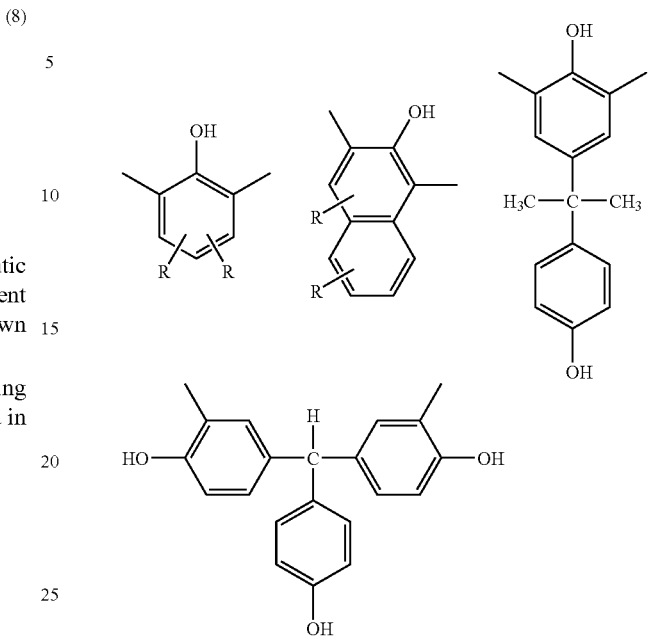

R is each independently a hydrogen atom, a halogen atom or a substituted or unsubstituted, monovalent hydrocarbon radical of 1 to 8 carbon atoms, and k is a natural number of 1 to 5.

The polyimide-polysiloxane copolymer of the second embodiment can be synthesized by reacting substantially equimolar amounts of at least one diamine compound having the general formula (4), at least one diamine compound having the general formula (5), and at least one diamine compound having the general formula (10):

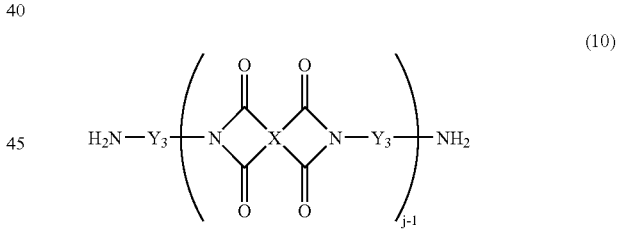
(10)

wherein X, $Y_3$ and j are as defined above, with at least one member selected from among tetracarboxylic acid dianhydrides having the general formula (6) and (7), their precursors, tetracarboxylic acids and ester derivatives thereof. It is requisite that at least a mixture of the diamine compound of formula (4) and the diamine compound of formula (10) be reacted with at least the tetracarboxylic acid dianhydride of formula (7) or tetracarboxylic acid precursor thereto or ester derivative thereof, and at least a mixture of the diamine compound of formula (5) and the diamine compound of formula (10) be reacted with at least the tetracarboxylic acid dianhydride of formula (6) or its precursor, tetracarboxylic acid or ester derivative thereof.

The polyimide oligomers having the general formula (10) can be prepared by reacting a tetracarboxylic acid dianhydride of the structural formula (11):

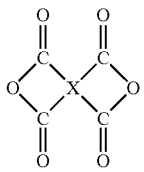

(11)

wherein X is as defined above, with an aromatic diamine of the structural formula (14) at a predetermined molar ratio in an organic solvent to form a polyamic acid resin, followed by cyclodehydration in a conventional manner.

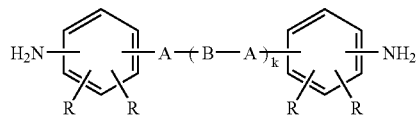

(14)

In formula (14), k is a natural number of 1 to 5,

A is

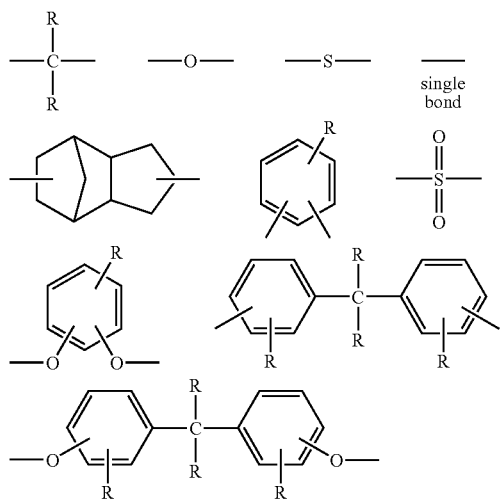

B is

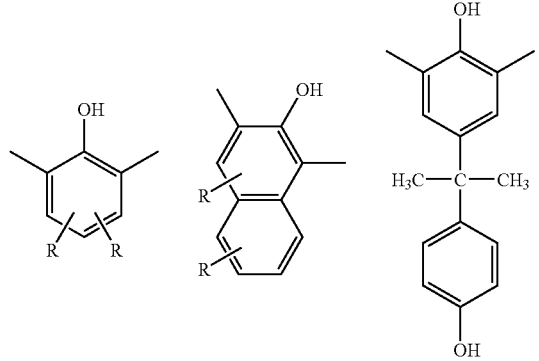

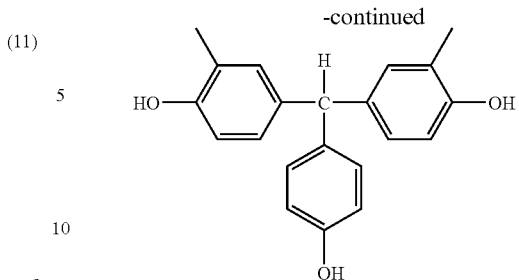

-continued

Herein, R is each independently a hydrogen atom, a halogen atom or a substituted or unsubstituted, monovalent hydrocarbon radical of 1 to 8 carbon atoms. Exemplary halogen atoms include fluorine, bromine and iodine.

Exemplary monovalent hydrocarbon radicals include alkyl, alkenyl, alkynyl and aryl radicals, and substituted forms of the foregoing in which some or all of the hydrogen atoms are replaced by halogen atoms such as fluorine, for example, methyl, ethyl, propyl, isopropyl, n-butyl, isobutyl, tert-butyl, hexyl, cyclohexyl, vinyl, allyl, propenyl, hexenyl, phenyl and trifluoromethyl.

Specifically, t moles of the tetracarboxylic acid dianhydride (11) and (t+1) moles of the diamine (14) are used wherein t is a natural number of at least 1, for example, in a range of 1 to 49.

In one preferred procedure for effecting the reaction to form the polyimide oligomer (10), the diamine component having phenolic hydroxyl radicals is previously dispersed or dissolved in an organic solvent in a reactor vessel, the acid dianhydride component dissolved or dispersed in an organic solvent is added dropwise thereto at low temperature, and the resulting mixture is stirred and thereafter heated. If the phenolic hydroxyl radical-containing diamine is added dropwise under acid dianhydride-rich conditions, esterification by the reaction of carboxylic acid with phenolic hydroxyl radicals can occur simultaneously with amide formation by the reaction of carboxylic acid with amine, resulting in three-dimensional crosslinking and gelation. The gelled product, which has an ester bond structure, undergoes hydrolysis under hot humid conditions and disintegrates into low molecular weight fragments, causing a loss of moisture-proof reliability.

The thus obtained polyimide oligomers often have a molecular weight distribution. The letter j in formula (10) and structural formula (8) derived therefrom is given, for example, as a statistical average value such as a weight average over the entire polyimide oligomer component (10), and for an individual molecule, j is a natural number of 2 to 50, preferably a natural number of 2 to 40, more preferably a natural number of 3 to 40, even more preferably a natural number of 5 to 40. The proportion of j being equal to or less than 2 is preferably less than 50% of the entirety, and more preferably less than 40% of the entirety. A value of j in excess of 50 is undesired because the oligomer becomes less compatible with the acid anhydride-terminated oligomer so that the film loses homogeneity. If the proportion of j being equal to or less than 2 is equal to or more than 50% of the entirety, the advantages of low modulus and high heat resistance due to partial block formation may fade away.

The target partial block polyimide-polysiloxane copolymer having highly reactive phenolic hydroxyl radicals can be synthesized by reacting diamine compounds having the general formulae (10), (4) and (5) with at least one member selected from among tetracarboxylic acid dianhydrides having the general formulae (6) and (7), their precursors, tetracarboxylic acids and ester derivatives thereof, in substantially equimolar amounts, for example, 1 mole of the former with 0.95 to 1.1 moles of the latter. The reaction to form the polyimide may be the same as the reaction to form the polyimide oligomer set forth above. Any organic solvent as exemplified above may be used.

Particularly when a phenolic hydroxyl radical-containing polyimide oligomer is used, the amine-terminated oligomer having phenolic hydroxyl radicals is previously dispersed or dissolved in an organic solvent in a reactor vessel, the acid dianhydride-terminated component dissolved or dispersed in an organic solvent is added dropwise thereto at low temperature, and the resulting mixture is stirred and thereafter heated. This procedure is preferred because the side reaction or esterification of phenolic hydroxyl radicals with acid anhydride radicals is restrained.

Provided that the molar amounts of $Y_1$, $Y_2$ and $Y_3$ contained in the copolymer are $y_1$ moles, $y_2$ moles and $y_3$ moles, respectively, the partial block polyimide-polysiloxane copolymer should contain siloxane component $Y_2$ in a molar ratio $y_2/(y_1+y_2+y_3)=0.01$ to 0.80, and preferably 0.02 to 0.70. A value $y_2/(y_1+y_2+y_3)$ of less than 0.01 provides a less modulus-reducing effect whereas a value $y_2/(y_1+y_2+y_3)$ of more than 0.80 undesirably leads to degradation of heat resistance and an increase of moisture permeability. The copolymer should contain phenolic hydroxyl radical-containing component $Y_3$ in a molar ratio $y_3/(y_1+y_2+y_3)=0.01$ to 0.98, and preferably 0.02 to 0.95. A value $y_3/(y_1+y_2+y_3)$ of less than 0.01 is too low to achieve the effect of creating a network structure with phenolic hydroxyl radicals serving as crosslink sites whereas a value $y_3/(y_1+y_2+y_3)$ of more than 0.98 makes it difficult to reduce modulus. The copolymer should contain $Y_1$ in a molar ratio $y_1/(y_1+y_2+y_3)=0.01$ to 0.98, and preferably 0.02 to 0.96.

By locally incorporating highly reactive phenolic hydroxyl radicals into the partial block polyimide-polysiloxane copolymer, a network structure with phenolic hydroxyl radicals serving as crosslink sites can be created while maintaining a low modulus.

The third embodiment of the present invention is a partial block polyimide-polysiloxane copolymer comprising repeat unit structures having the structural formulae (2) and (8), but not units having formula (1).

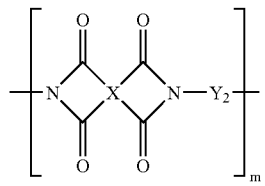

(2)

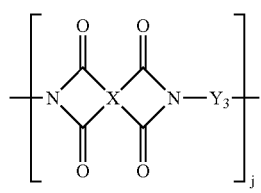

(8)

Herein X is one or more aromatic or aliphatic ring-containing tetravalent organic radicals, $Y_2$ is a divalent organic radical having the structural formula (3), $Y_3$ is a divalent organic radical having the structural formula (9). The copolymer should contain $Y_2$ and $Y_3$ in molar amounts $y_2$ and $y_3$, respectively, which satisfy $y_2/(y_2+y_3)=0.99$ to 0.01 and $y_3/(y_2+y_3)=0.01$ to 0.99. The letter m is a natural number of 2 to 50, and j is a natural number of 2 to 50.

The preferred value $y_2/(y_2+y_3)$ is in a range of 0.05 to 0.98 and the preferred value $y_3/(y_2+y_3)$ is thus in a range of 0.02 to 0.95. The letter m is preferably in a range of 2 to 40, more preferably 3 to 40, and even more preferably 5 to 40; and j is preferably in a range of 2 to 40, more preferably 3 to 40, and even more preferably 5 to 40.

The copolymer of the third embodiment generally has a weight average molecular weight of about 5,000 to about 200,000, preferably about 8,000 to about 150,000. With too low a molecular weight, the cured film may have a low strength.

The partial block polyimide-polysiloxane copolymer of the third embodiment can be synthesized by reacting substantially equimolar amounts of at least one diamine compound having the general formula (10):

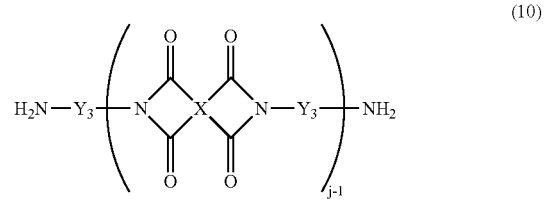

(10)

wherein X, $Y_3$, and j are as defined above, with at least one tetracarboxylic acid dianhydride having the general formula (7):

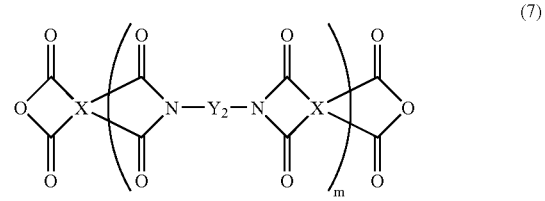

(7)

wherein X, $Y_2$, and m are as defined above, or its precursor, tetracarboxylic acid or ester derivative thereof, for example, 1 mole of the former with 0.95 to 1.1 moles of the latter according to the same procedure as set forth above for the first and second embodiments.

The phenolic hydroxyl radical-containing partial block polyimide-polysiloxane copolymer of the invention is a resin prepared using a diamine having an amino radical attached to an aromatic ring (typically, benzene ring) and a phenolic hydroxyl radical on another aromatic ring (typically, benzene or naphthalene ring). Particularly when this resin is compounded with an epoxy resin having at least two glycidyl radicals and preferably a curing agent, the resulting resin composition has a low modulus of elasticity and improved adhesion and reliability. The resin composition is typically applied to a support substrate as varnish, whereupon it cures into a coating having improved adhesion to copper foil or the like.

The epoxy resin having at least two glycidyl radicals used herein is not particularly limited. Useful examples are glycidyl type (inclusive of methyl glycidyl type) epoxy resins including glycidyl ethers of phenols such as bisphenol A, bisphenol F, resorcinol, phenol novolac, and cresol novolac, glycidyl ethers of alcohols such as butane diol, polyethylene glycol and polypropylene glycol, glycidyl ethers of carboxylic acids such as phthalic acid, isophthalic acid, and tetrahydrophthalic acid, and derivatives of aniline, isocyanuric acid and the like in which active hydrogen attached to a nitrogen atom is substituted with a glycidyl radical; alicyclic epoxy resins obtained by epoxidizing an olefin bond within the molecule such as vinylcyclohexene diepoxide, 3,4-epoxycyclohexylmethyl-3,4-epoxycyclohexane carboxylate, and 2-(3,4-epoxy)cyclohexyl-5,5-spiro(3,4-epoxy)cyclohexane-m-dioxane; glycidyl ethers of p-xylylene-modified phenolic resins, glycidyl ethers of m-xylylene/p-xylylene-modified phenolic resins, glycidyl ethers of terpene-modified phenolic resins, glycidyl ethers of dicyclopentadiene-modified phenolic resins, glycidyl ethers of cyclopentadiene-modified phenolic resins, glycidyl ethers of polycyclic aromatic ring-modified phenolic resins, glycidyl ethers of naphthalene ring-containing phenolic resins, and biphenyl type epoxy resins. They may be used alone or in admixture of any.

The epoxy resin curing agent used herein is not critical as long as it serves as an agent for curing the epoxy resin. Exemplary curing agents are phenolic compounds, acid anhydrides and amine compounds, with the phenolic compounds being preferred. Examples of the phenolic compounds include resins obtained by condensation or co-condensation of a phenol (e.g., phenol, cresol, xylenol, hydroquinone, resorcinol, catechol, bisphenol A or bisphenol F) or a naphthol (e.g., α-naphthol, β-naphthol or dihydroxynaphthalene) with an aldehyde (e.g., formaldehyde, acetaldehyde, propionaldehyde, benzaldehyde or salicylaldehyde) in the presence of an acidic catalyst; phenolic resins having a xylylene skeleton synthesized from a phenol and dimethoxy-p-xylene or the like; phenolic resins having a dicyclopentadiene skeleton; phenolic resins having a cyclopentadiene skeleton; melamine-modified phenolic resins; terpene-modified phenolic resins; polycyclic aromatic ring-modified phenolic resins; naphthol resins having a xylylene skeleton, and the like, alone or in admixture of any.

The curing agent is used in an effective cure amount which varies with a particular type. Usually, the amount of the curing agent is 1 to 100 parts by weight, preferably 5 to 50 parts by weight per 100 parts by weight of the epoxy resin. Less than 1 pbw of the curing agent is insufficient for the composition to cure effectively. More than 100 pbw of the curing agent leads to disadvantages including an economical loss, a long time taken for curing of the epoxy resin because of dilution, and poor physical properties of cured products.

In the practice of the invention, a curing catalyst for epoxy resins may be used. Useful curing catalysts are phosphorus catalysts and amine catalysts, thought not limited thereto. Suitable phosphorus catalysts include triphenylphosphine, triphenylphosphonium triphenylborate, tetraphenylphosphonium tetraphenylborate, and compounds of the following formula.

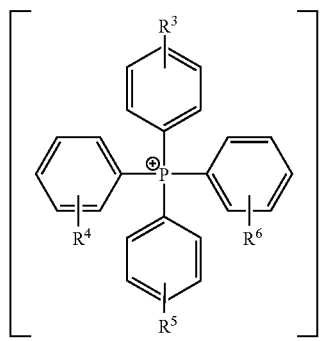

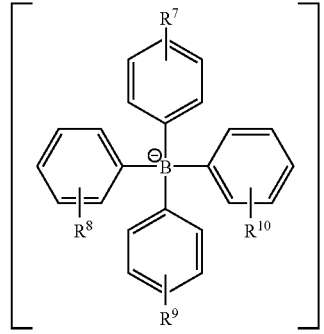

Herein $R^3$ to $R^{10}$ are selected from among hydrogen, halogen atoms (e.g., fluorine, bromine and iodine), $C_{1-8}$ alkyl, alkenyl, alkynyl, $C_{1-8}$ alkoxy, trifluoromethyl and phenyl radicals. All these substituent radicals may be the same or different.

Suitable amine catalysts include imidazole derivatives such as 2-methylimidazole, 2-ethyl-4-methylimidazole, 1-cyanoethyl-2-methylimidazole and 2-phenyl-4,5-dihydroxymethylimidazole. The curing catalysts may be used alone or in admixture of any.

The compounding proportion of the partial block polyimide-polysiloxane copolymer having phenolic hydroxyl radicals, the epoxy resin and the epoxy resin curing agent is of importance. In the inventive composition, curing reaction takes place utilizing the reaction of phenolic hydroxyl radicals with epoxy radicals. If too less epoxy radicals are available, adhesion to an adherend becomes insufficient. If too much epoxy radicals are available, the excess of epoxy resin increases the modulus of elasticity, which is inconvenient to form a flexible polyimide resin composition. Therefore, a mixture of the epoxy resin and the epoxy resin curing agent is used in an amount of 1 to 900 parts by weight, preferably 5 to 400 parts by weight per 100 parts by weight of the block copolymer.

The amount of the epoxy resin curing catalyst added is usually up to about 40 parts by weight (0 to 40 parts by weight), preferably about 0.01 to about 40 parts by weight, more preferably about 0.1 to about 20 parts by weight per 100 parts by weight of the epoxy resin and the epoxy resin curing agent combined. Too small an amount of the curing catalyst may require a long time for curing or lead to under-cure. Too large an amount of the curing catalyst may adversely affect the shelf stability of the composition.

The resin composition of the invention is desirably prepared by combining the above components and thoroughly mixing them for a time of at least 5 minutes in order to prevent separation of the components. The thus prepared polyimide resin composition is dissolvable in an aprotic polar solvent such as cyclohexanone or NMP and ready for use as varnish.

The resin composition of the invention is coated to a support substrate to form a coating or film having good adhesion to copper foil or the like. The coating is usually cured by heating at 160° C. or higher, preferably at 200° C. or higher.

EXAMPLE

Examples of the invention are given below by way of illustration and not by way of limitation. All parts are by weight (abbreviated as pbw). The following abbreviations are used to designate the reactants used in Examples.

BPDA: 3,3',4,4'-biphenyltetracarboxylic acid dianhydride

BTDA: 3,3',4,4'-benzophenonetetracarboxylic acid dianhydride
DPE: 4,4'-diaminodiphenyl ether
BAPP: 2,2-bis(4-(4-aminophenoxy)phenyl)propane
6FDA: 2,2-bis(3,4-benzenedicarboxylic anhydride)perfluoropropane Glass Transition Temperature (Tg)
 Analyzer: TM-7000 (ULVAC Inc.)
 Measurement mode: tensile
 Specimen: 15 mm×5 mm×50 μm
 Measuring temperature: RT to 300° C. (heating rate 5° C./min)

Young's Modulus
 Analyzer: solid viscoelasticity meter (Yoshimizu Co., Ltd.)
 Specimen: 20 mm×5 mm×50 μm
 Measuring temperature: RT to 300° C. (heating rate 5° C./min)

Gel Permeation Chromatography (GPC)
 Analyzer: HLC-8120GPC (Tosoh Co., Ltd.)
 Column temperature: 40° C.
 Elute: THF
 Flow velocity: 0.6 ml/min
 Sample concentration: 1.0 wt %
 Molecular weight basis: polystyrene standards Example 1

A 1-liter separable flask equipped with a reflux condenser, a Dean-Stark trap, a thermometer and a stirrer was charged with 53.31 pbw of 6FDA as an acid dianhydride component and 418 pbw of cyclohexanone, which were stirred at 50° C. for dispersing the acid dianhydride. To the dispersion, 86.00 pbw of diaminosiloxane KF-8010 (both end γ-aminopropyldimethylsiloxy-blocked dimethylpolysiloxane, weight average molecular weight 860, Shin-Etsu Chemical Co., Ltd.) as a diamine component was added dropwise. The mixture was stirred for 12 hours at room temperature for reaction, synthesizing a polyamic acid oligomer solution #1. The solution, to which 40 ml of toluene was added as a dehydrating solvent, was heated and dehydrated at about 160° C. for 8 hours, with about 3.6 ml of water being distilled off. This yielded an acid anhydride-terminated polyimide oligomer solution #1.

The solvent was distilled off from the resin solution, followed by vacuum drying. The resulting resin was analyzed by infrared absorption spectroscopy, detecting absorption peaks attributable to imide radicals at 1770 $cm^{-1}$ and 1720 $cm^{-1}$, with no absorption peak attributable to polyamic acid indicating the presence of unreacted functional radicals. The resin had a weight average molecular weight of about 9,000 as measured by GPC relative to polystyrene standards (m in formula (7) had a weight average value of 6.7).

Subsequently, the same reactor as above was charged with 8.01 pbw of DPE and 24.63 pbw of BAPP as diamine components, and 205 pbw of cyclohexanone, which were stirred at 50° C. for dissolution. To the solution, 35.54 pbw of 6FDA as an acid dianhydride component was added in small divided portions. The mixture was stirred for 12 hours at room temperature for reaction, synthesizing a polyamic acid oligomer solution #2. The solution, to which 40 ml of toluene was added as a dehydrating solvent, was heated and dehydrated at about 160° C. for 8 hours, with about 2.8 ml of water being distilled off. This yielded an amino-terminated polyimide oligomer solution #2.

The resin was similarly isolated and analyzed by IR absorption spectroscopy, detecting absorption peaks attributable to imide radicals at 1770 $cm^{-1}$ and 1720 $cm^{-1}$, with no absorption peak attributable to polyamic acid indicating the presence of unreacted functional radicals. The resin had a weight average molecular weight of about 5,000 as measured by GPC relative to polystyrene standards (L-1 in formula (4) had a weight average value of 6.4).

The polyimide oligomer solution #1 and polyimide oligomer solution #2, prepared above, were fed to a 1-liter separable flask equipped with a reflux condenser, a Dean-Stark trap, a thermometer and a stirrer where the mixture was stirred for 6 hours at 50° C. for reaction. The solution, to which 20 ml of toluene was added, was heated and dehydrated at about 160° C. for 8 hours, with about 0.7 ml of water being distilled off. This yielded a uniform, brown, clear solution of partial block polyimide-polysiloxane copolymer in cyclohexanone. The resin could be isolated from the solution by distilling off the solvent and drying the residue in vacuum.

A test specimen was prepared by the following procedure. First, a support such as an organic separator or metal foil was furnished. The cyclohexanone solution of partial block polyimide-polysiloxane copolymer was applied onto the support by casting or the like so that the coating might have a thickness of about 50 μm after drying. The coating was dried at 80° C. for 30 minutes. The resulting adhesive film was stripped from the support (e.g., organic separator or metal foil), attached to a stainless steel frame, and heat treated at 200° C. for 2 hours, whereby the film was dried and cured. This resin film having a smooth surface was ready for measurement.

The resin film, when subjected to the thermomechanical test, exhibited a Tg of 190° C. and a Young's modulus of 500 MPa at 25° C.

Example 2

A 1-liter separable flask equipped with a reflux condenser, a Dean-Stark trap, a thermometer and a stirrer was charged with 45.11 pbw of BTDA as an acid dianhydride component and 445 pbw of cyclohexanone, which were stirred at 50° C. for dispersing the acid dianhydride. To the dispersion, 103.20 pbw of diaminosiloxane KF-8010 (Shin-Etsu Chemical Co., Ltd.) as a diamine component was added dropwise. The mixture was stirred for 12 hours at room temperature for reaction, synthesizing a polyamic acid oligomer solution #3. The solution, to which 40 ml of toluene was added as a dehydrating solvent, was heated and dehydrated at about 160° C. for 8 hours, with about 4.3 ml of water being distilled off. This yielded an acid anhydride-terminated polyimide oligomer solution #3.

The solvent was distilled off from the resin solution, followed by vacuum drying. The resulting resin was analyzed by IR absorption spectroscopy, detecting absorption peaks attributable to imide radicals at 1770 $cm^{-1}$ and 1720 $cm^{-1}$, with no absorption peak attributable to polyamic acid indicating the presence of unreacted functional radicals. The resin had a weight average molecular weight of about 10,800 as measured by GPC relative to polystyrene standards (m in formula (7) had a weight average value of 9.1).

Subsequently, the same reactor as above was charged with 49.26 pbw of BAPP as a diamine component and 236 pbw of cyclohexanone, which were stirred at 50° C. for dissolution. To the solution, 29.42 pbw of BPDA as an acid dianhydride component was added in small divided portions. The mixture was stirred for 12 hours at room temperature for reaction, synthesizing a polyamic acid oligomer solution #4. The solution, to which 40 ml of toluene was added as a dehydrating solvent, was heated and dehydrated at about 160° C. for 8 hours, with about 3.6 ml of water being distilled off. This yielded an amino-terminated polyimide oligomer solution #4.

The resin was similarly isolated and analyzed by IR absorption spectroscopy, detecting absorption peaks attributable to imide radicals at 1770 cm$^{-1}$ and 1720 cm$^{-1}$, with no absorption peak attributable to polyamic acid indicating the presence of unreacted functional radicals. The resin had a weight average molecular weight of about 5,500 as measured by GPC relative to polystyrene standards (L-1 in formula (4) had a weight average value of 7.6).

The polyimide oligomer solution #3 and polyimide oligomer solution #4, prepared above, were fed to a 1-liter separable flask equipped with a reflux condenser, a Dean-Stark trap, a thermometer and a stirrer where the mixture was stirred for 6 hours at 50° C. for reaction. The solution, to which 20 ml of toluene was added, was heated and dehydrated at about 160° C. for 8 hours, with about 0.7 ml of water being distilled off. This yielded a uniform, brown, clear solution of partial block polyimide-polysiloxane copolymer in cyclohexanone. The resin could be isolated from the solution by distilling off the solvent and drying the residue in vacuum.

A test specimen was prepared by the same procedure as in Example 1. The resin film, when subjected to the thermomechanical test, exhibited a Tg of 195° C. and a Young's modulus of 550 MPa at 25° C.

Example 3

A 1-liter separable flask equipped with a reflux condenser, a Dean-Stark trap, a thermometer and a stirrer was charged with 59.36 pbw of a phenolic hydroxyl radical-containing aromatic diamine (Diamine-1) of the formula:

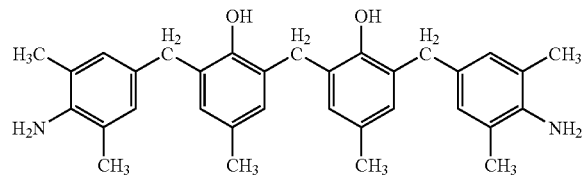

as a diamine component and 311 pbw of cyclohexanone, which were stirred at 50° C. for dissolution. To the solution, 44.42 pbw of 6FDA as an acid dianhydride component was added in small divided portions. The mixture was stirred for 12 hours at room temperature for reaction, synthesizing a polyamic acid oligomer solution #5. The solution, to which 40 ml of toluene was added as a dehydrating solvent, was heated and dehydrated at about 160° C. for 8 hours, with about 3.6 ml of water being distilled off. This yielded an amino-terminated polyimide oligomer solution #5.

The resin was similarly isolated and analyzed by IR absorption spectroscopy, detecting absorption peaks attributable to imide radicals at 1770 cm$^{-1}$ and 1720 cm$^{-1}$ and an absorption peak attributable to phenolic hydroxyl radicals at 3500 cm$^{-1}$, with no absorption peak attributable to polyamic acid indicating the presence of unreacted functional radicals. The resin had a weight average molecular weight of about 7,500 as measured by GPC relative to polystyrene standards (j-1 in formula (10) had a weight average value of 7.8).

The polyimide oligomer solution #5 was fed to a 1-liter separable flask equipped with a reflux condenser, a Dean-Stark trap, a thermometer and a stirrer. With stirring at 50° C., the polyimide oligomer solution #3, prepared in Example 2, was added dropwise. The resulting solution was stirred for 6 hours at 50° C. for reaction. The solution, to which 20 ml of toluene was added, was heated and dehydrated at about 160° C. for 8 hours, with about 0.7 ml of water being distilled off. This yielded a uniform, brown, clear solution of phenolic hydroxyl radical-containing partial block polyimide-polysiloxane copolymer in cyclohexanone. The resin could be isolated from the solution by distilling off the solvent and drying the residue in vacuum.

A test specimen was prepared by the same procedure as in Example 1. The resin film, when subjected to the thermomechanical test, exhibited a Tg of 190° C. and a Young's modulus of 450 MPa at 25° C.

To 200 pbw of the cyclohexanone solution of partial block polyimide-polysiloxane copolymer were added 35.64 pbw of an o-cresol novolac type epoxy resin EOCN1020 (Nippon Kayaku Co., Ltd., 220 g/Eq), 12.43 pbw of a phenol novolac resin TD2131 (Dainippon Ink & Chemicals, Inc., 110 g/Eq), and 0.5 pbw of a tertiary phosphorus catalyst TPP (Hokko Chemical Co., Ltd.). They were milled, yielding a heat resistant resin composition in solution form.

A test specimen was prepared by the same procedure as in Example 1. The resin film, when subjected to the thermomechanical test, exhibited a Tg of 190° C. and a Young's modulus of 750 MPa at 25° C.

Comparative Example 1

A 1-liter separable flask equipped with a reflux condenser, a Dean-Stark trap, a thermometer and a stirrer was charged with 88.85 pbw of 6FDA as an acid dianhydride component and 553 pbw of cyclohexanone, which were stirred at 50° C. for dispersing the acid dianhydride. To the dispersion, 86.00 pbw of diaminosiloxane KF-8010 (Shin-Etsu Chemical Co., Ltd.) as a diamine component was added dropwise. The mixture was stirred for 12 hours at room temperature for reaction. Subsequently, 8.01 pbw of DPE and 24.63 pbw of BAPP as diamine components in 70 pbw of cyclohexanone was added dropwise. The mixture was stirred for 12 hours at room temperature for reaction, synthesizing a polyamic acid solution #1. The solution, to which 60 ml of toluene was added as a dehydrating solvent, was heated and dehydrated at about 160° C. for 8 hours, with about 7.2 ml of water being distilled off. This yielded a polyimide siloxane solution #1.

The resin was isolated by distilling off the solvent and drying the residue in vacuum. It was analyzed by IR absorption spectroscopy, detecting absorption peaks attributable to imide radicals at 1770 cm$^{-1}$ and 1720 cm$^{-1}$, with no absorption peak attributable to polyamic acid indicating the presence of unreacted functional radicals. The resin had a weight average molecular weight of about 95,000 as measured by GPC relative to polystyrene standards.

A test specimen was prepared by the same procedure as in Example 1. The resin film, when subjected to the thermomechanical test, exhibited a Tg of 125° C. and a Young's modulus of 1,000 MPa at 25° C.

Comparative Example 2

A 1-liter separable flask equipped with a reflux condenser, a Dean-Stark trap, a thermometer and a stirrer was charged with 32.22 pbw of BTDA as an acid dianhydride component and 350 pbw of cyclohexanone, which were stirred at 50° C. for dispersing the acid dianhydride. To the dispersion, 84.28 pbw of diaminosiloxane KF-8010 (Shin-Etsu Chemical Co., Ltd.) as a diamine component was added dropwise. The mixture was stirred for 12 hours at room temperature for reaction, synthesizing a polyamic acid oligomer solution #6. The solution, to which 40 ml of toluene was added as a dehydrating solvent, was heated and dehydrated at about 160° C. for 8 hours, with about 3.5 ml of water being distilled off. This yielded an acid anhydride-terminated polyimide oligomer solution #6.

The resin was isolated by distilling off the solvent and drying the residue in vacuum. It was analyzed by IR absorption spectroscopy, detecting absorption peaks attributable to imide radicals at 1770 cm$^{-1}$ and 1720 cm$^{-1}$, with no absorption peak attributable to polyamic acid indicating the presence of unreacted functional radicals. The resin had a weight average molecular weight of about 85,000 as measured by GPC relative to polystyrene standards (m in formula (7) had a weight average value of 74).

Subsequently, the same reactor as above was charged with 40.23 pbw of BAPP as a diamine component and 205 pbw of cyclohexanone, which were stirred at 50° C. for dissolution. To the solution, 28.25 pbw of BPDA as an acid dianhydride component was added in small divided portions. The mixture was stirred for 12 hours at room temperature for reaction, synthesizing a polyamic acid oligomer solution #7. The solution, to which 40 ml of toluene was added as a dehydrating solvent, was heated and dehydrated at about 160° C. for 8 hours, with about 3.4 ml of water being distilled off. This yielded an amino-terminated polyimide oligomer solution #7.

The resin was similarly isolated and analyzed by IR absorption spectroscopy, detecting absorption peaks attributable to imide radicals at 1770 cm$^{-1}$ and 1720 cm$^{-1}$, with no absorption peak attributable to polyamic acid indicating the presence of unreacted functional radicals. The resin had a weight average molecular weight of about 52,000 as measured by GPC relative to polystyrene standards (L-1 in formula (4) had a weight average value of 77).

The polyimide oligomer solution #6 and polyimide oligomer solution #7, prepared above, were fed to a 1-liter separable flask equipped with a reflux condenser, a Dean-Stark trap, a thermometer and a stirrer where the mixture was stirred for 6 hours at 50° C. for reaction. The solution, to which 20 ml of toluene was added, was heated and dehydrated at about 160° C. for 8 hours, with about 0.7 ml of water being distilled off. The resulting resin solution, in which both m in formula (7) and L-1 in formula (4) are more than 50, lacked compatibility and uniformity, and separated into two layers. A test specimen prepared by the same procedure as in Example 1 had a non-uniform rough surface.

Comparative Example 3

A 1-liter separable flask equipped with a reflux condenser, a Dean-Stark trap, a thermometer and a stirrer was charged with 45.11 pbw of BTDA and 44.42 pbw of 6FDA as acid dianhydride components and 636 pbw of cyclohexanone, which were stirred at 50° C. for dispersing the acid dianhydrides. To the dispersion, 103.20 pbw of diaminosiloxane KF-8010 (Shin-Etsu Chemical Co., Ltd.) as a diamine component was added dropwise. The mixture was stirred for 12 hours at room temperature for reaction, synthesizing an acid anhydride-rich polyamic acid solution #2. Another 1-liter separable flask equipped with a reflux condenser, a Dean-Stark trap, a thermometer and a stirrer was charged with 59.36 pbw of Diamine-1 (used in Example 3) as a diamine component and 120 pbw of cyclohexanone, which were stirred at 50° C. for dissolution. To this solution, the polyamic acid solution #2, prepared above, was added dropwise. The mixture was stirred for 12 hours at room temperature for reaction, synthesizing a polyamic acid solution #3. The solution, to which 60 ml of toluene was added as a dehydrating solvent, was heated and dehydrated at about 160° C. for 8 hours, with about 8.6 ml of water being distilled off. This yielded a polyimide siloxane solution #3.

The resin was isolated by distilling off the solvent and drying the residue in vacuum. It was analyzed by IR absorption spectroscopy, detecting absorption peaks attributable to imide radicals at 1770 cm$^{-1}$ and 1720 cm$^{-1}$ and an absorption peak attributable to phenolic hydroxyl radicals at 3500 cm$^{-1}$, with no absorption peak attributable to polyamic acid indicating the presence of unreacted functional radicals. The resin had a weight average molecular weight of about 100,000 as measured by GPC relative to polystyrene standards.

A test specimen was prepared by the same procedure as in Example 1. The resin film, when subjected to the thermomechanical test, exhibited a Tg of 130° C. and a Young's modulus of 1,100 MPa at 25° C.

To 200 pbw of the cyclohexanone solution of polyimide siloxane were added 35.64 pbw of an o-cresol novolac type epoxy resin EOCN1020 (Nippon Kayaku Co., Ltd., 220 g/Eq), 12.43 pbw of a phenol novolac resin TD2131 (Dainippon Ink & Chemicals, Inc., 110 g/Eq), and 0.5 pbw of a tertiary phosphorus catalyst TPP (Hokko Chemical Co., Ltd.). They were milled, yielding a heat resistant resin composition in solution form.

A test specimen was prepared by the same procedure as in Example 1. The resin film, when subjected to the thermomechanical test, exhibited a Tg of 150° C. and a Young's modulus of 1,600 MPa at 25° C.

It is noted with respect to the polyimide siloxane lo copolymer of Comparative Example 3 that because the acid anhydride-rich polyamic acid solution #2 is reacted with Diamine-1 in the solvent at the polyamic acid stage in the course of synthesis of polyimide siloxane solution #3, exchange reaction takes place between the amides so that the resulting polyimide siloxane becomes a random copolymer. The process forms a random copolymer rather than a partial block polyimide-polysiloxane copolymer within the scope of the invention.

Japanese Patent Application No. 2004-151486 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A partial block polyimide-polysiloxane copolymer comprising repeat unit structures having the following structural formulae (2) and (8):

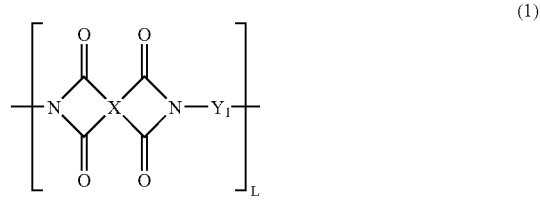

-continued

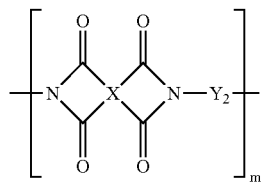
(2)

wherein X is at least one aromatic ring-containing tetravalent organic radical selected from the group consisting of:

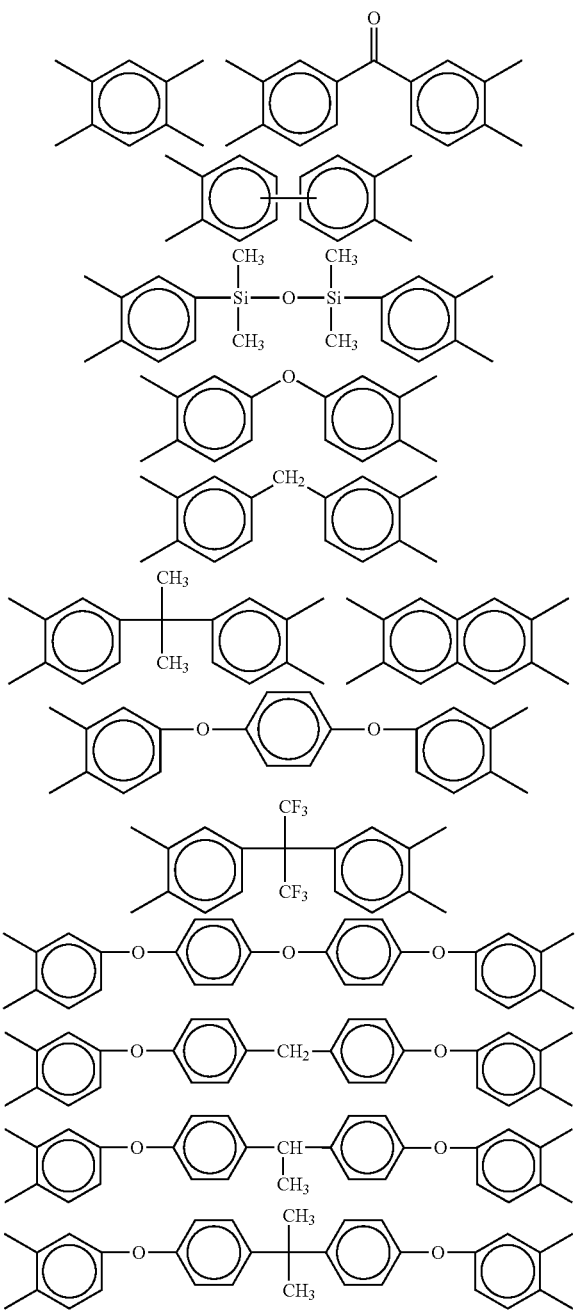

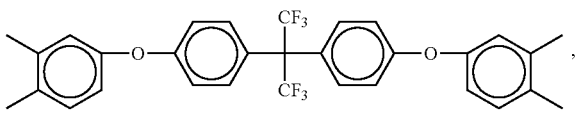
and $Y_2$ is a divalent organic radical having the structural formula (3), $Y_3$ is a divalent organic radical having the structural formula (9), $Y_2$ and $Y_3$ are contained in the copolymer in molar amounts $y_2$ and $y_3$, respectively, which satisfy $y_2/(y_2+y_3) = 0.5$ to $0.01$ and $y_3/(y_2+y_3) = 0.5$ to $0.99$, m is a weight average value of 9.1 to 50, j is a weight average value of 8.8 to 50,

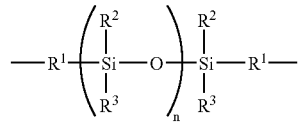
(3)

wherein $R^1$ is a divalent organic radical of 3 to 9 carbon atoms, $R^2$ and $R^3$ are each independently a substituted or unsubstituted, monovalent hydrocarbon radical of 1 to 8 carbon atoms, and n is an integer of 1 to 150,

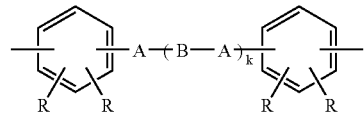
(9)

wherein A is a radical selected from the following group [9a]:

group [9a]

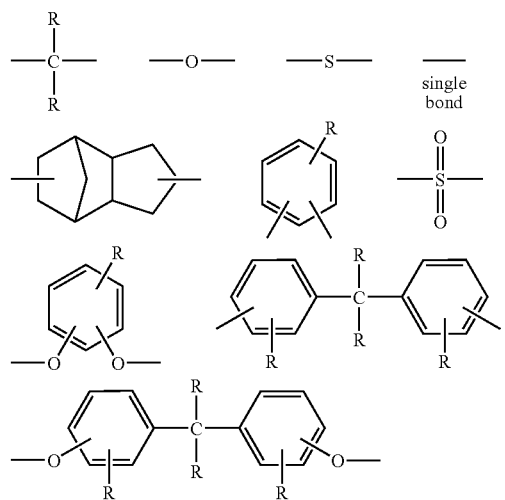

B is a radical selected from the following group [9b]:
group [9b]

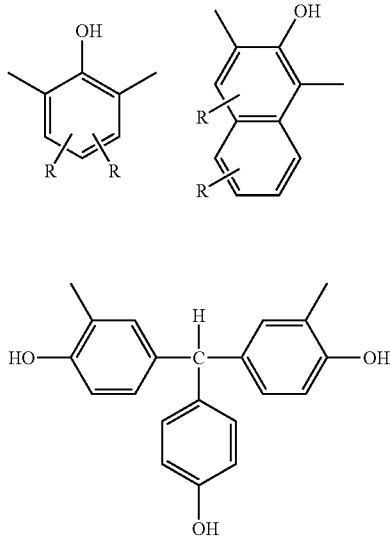

R is each independently a hydrogen atom, halogen atom or substituted or unsubstituted, monovalent hydrocarbon radical of 1 to 8 carbon atoms, and k is a natural number of 1 to 5.

2. A method for preparing the partial block polyimide-polysiloxane copolymer of claim 1, comprising the step of reacting substantially equimolar amounts of at least one diamine compound having the general formula (10):

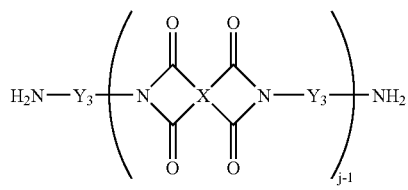

wherein X, Y₃, and j are as defined in claim 1, with at least one tetracarboxylic acid dianhydride having the general formula (7):

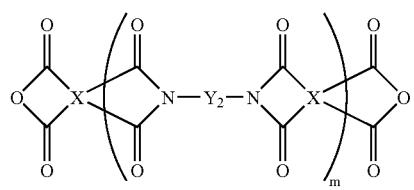

wherein X, Y₂, and m are as defined in claim 1, or its precursor, tetracarboxylic acid or ester derivative thereof.

3. A resin composition comprising the partial block polyimide-polysiloxane copolymer of claim 1 and an epoxy resin having at least two epoxy radicals in a molecule.

4. The partial block polyimide-polysiloxane copolymer of claim 1, wherein X is at least one aromatic ring-containing tetravalent organic radical selected from the group consisting of:

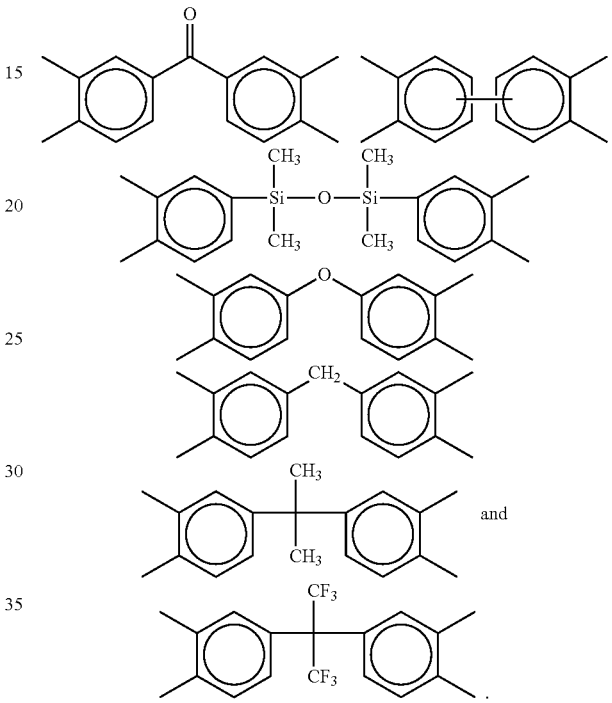

5. The partial block polyimide-polysiloxane copolymer of claim 1, wherein X is at least one aromatic ring-containing tetravalent organic radical selected from the group consisting of:

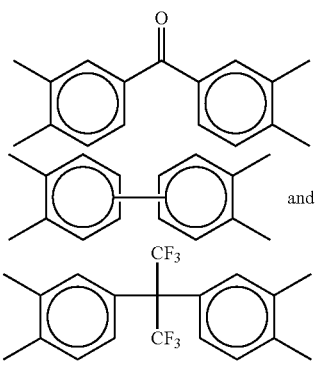

* * * * *